Sept. 3, 1929.  W. COOPER  1,726,694

ANIMAL TRAP

Filed March 22, 1928

INVENTOR.
WILLIAM COOPER.
BY Philip S. Hopkins
ATTORNEY

Patented Sept. 3, 1929.

1,726,694

UNITED STATES PATENT OFFICE.

WILLIAM COOPER, OF APALACHIN, NEW YORK, ASSIGNOR TO THE COOPER HUMANE TRAP CO. INC., OF APALACHIN, NEW YORK.

ANIMAL TRAP.

Application filed March 22, 1928. Serial No. 263,752.

My invention relates generally to traps for the taking of fur bearing animals and is particularly designed for use in holes where the area within which the moving parts of the trap can swing is necessarily restricted.

The primary object of my invention is to provide such a trap, the movable bail of which swings substantially within the planes defined by the outside edges of the frame of the trap.

Another object is to provide a trap of this character which admits an animal to the trap springing or setting off position from two directions.

Still another object is to provide a trap which when set in a hole cannot be sprung by an animal before the animal is far enough within the trap to insure its being caught.

A further object is to provide such a trap which will not injure the fur of the animal, but which will kill it instantly, thereby fulfilling the requirements of a humane trap.

A still further object is to provide a trap of the character described which is unusually simple in construction and operation, easy to set, light in weight and economical of manufacture.

Other objects and advantages in details of construction and operation will be apparent as the description proceeds, reference now being had to the figures of the accompanying drawing wherein like reference numerals indicate like parts.

In the drawing:—

Figure 1:
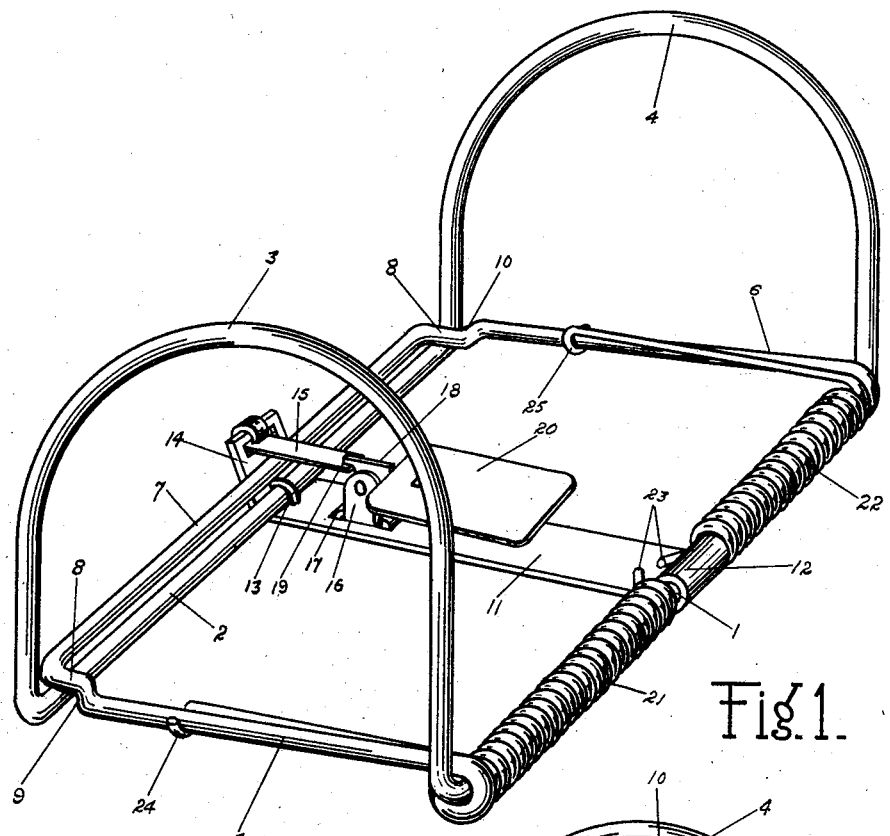
Figure 1 is a detail perspective view of the trap in set position.
Figure 2:
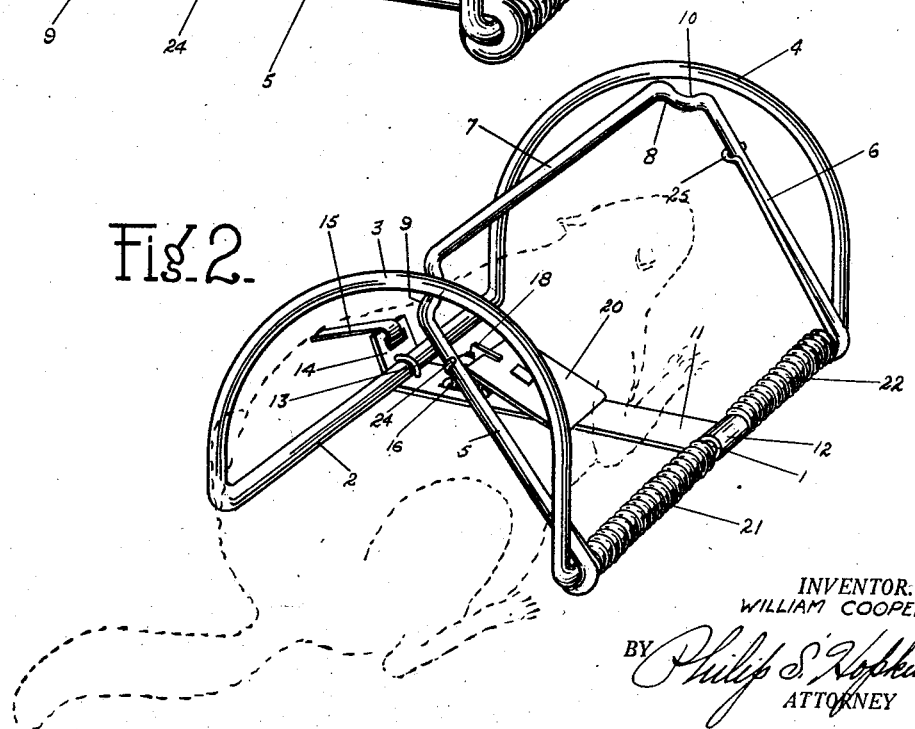
Figure 2 is a detail perspective view thereof in sprung position illustrating the manner of taking an animal.

My improved trap consists primarily of a one piece frame preferably of wire bent to form the horizontal and parallel side members 1 and 2 and the vertical parallel end members 3 and 4, the latter taking the form of upwardly projecting loops. Pivoted at the ends of the side member 1 of the frame, directly adjacent and just inside the end members 3 and 4, are the legs 5 and 6 of a bail, the closed portion 7 of which, when in set position, lies directly adjacent to and parallel with the side member 2. The legs 5 and 6 of the bail, in extending across the frame between the sides 1 and 2, angle outwardly with respect to the end members 3 and 4 from their pivotal points, crossing the vertical plane of said end members 3 and 4. At points adjacent the junctures of the side member 2 with the end members 3 and 4, the legs 5 and 6 are bent inwardly past the vertical legs of the end members 3 and 4, then again straightened out parallel with the legs 5 and 6 as at 8, crossing the side member 2 and joining with the closed portion 7 of the bail. This construction provides shoulders 9 and 10 lying in the same planes as the end members 3 and 4 respectively.

A base plate 11 is suitably secured at one end to the side member 1 centrally thereof as at 12, and extends directly across between the parallel side members 1 and 2 and is secured adjacent its opposite end as at 13 to the side member 2. The end of this base member 11 adjacent the side member 2, however, is extended beyond said side member and angles upwardly as at 14 to pivotally receive at its upper free end one end of a trigger arm 15 adapted to overlie both the side member 2 and the closed portion 7 of the bail. Suitably mounted upon the base member 11 is a bracket 16 provided with a pintle 17 to which is pivoted a trip arm 18, one end of which is adapted to engage the free end of the trigger 15 as at 19, and the opposite end of which supports the trip pan 20.

A pair of heavy coil springs 21 and 22 encircle the side member 1 on each side of the base member 11, each of said springs being anchored at their inner ends to the base member 11 as at 23, and the opposite end of the spring 21 having bearing against the underside of the leg 5 of the bail as at 24, and the free end of the spring 22 similarly engaging the leg 6 of the bail as at 25, whereby to normally urge said bail upwardly.

It should be noted particularly that the shoulders 9 and 10 on the legs 5 and 6 of the bail, lying in the same planes as the end members 3 and 4 of the frame, prevent the bail from passing completely out of the frame under the influence of the springs 21 and 22, and providing for a sufficient restriction of the space between the legs 5 and 6 of the bail and the end members 3 and 4, when the bail is sprung, to easily hold an animal caught therebetween.

The operation of my invention is as follows:—

The trapper first sets the trap by swinging the bail downwardly against the tension of the springs 21 and 22 until the closed portion 7 thereof overlies the side member 2, where-upon the trigger 15 is brought over said portion 7 and the free end thereof engaged with the trip lever 18, the tension of the springs 21 and 22 on the bail tending to hold the trigger and trip lever 18 together as shown in Figure 1, and with the trip pan 20 raised. The trap may now be placed in a hole with the end members 3 and 4 in alignment with the passage therethrough, then the trap covered with leaves, twigs, etc. for concealing it. Obviously in such position, an animal entering or leaving the hole must pass through one of the looped end members 3 or 4, and over the corresponding leg 5 or 6 of the bail. By the time the animal reaches the trip pan 20, it will be clear that it will have a substantial portion of its body within the frame of the trap, and promptly upon stepping on the trap pan 20, the bail will be released to swing violently on its pivot and within the planes of the frame, constricting the space between the legs 5 and 6 and the adjacent end members 3 and 4 and obviously striking with all the force of the springs, the body of an animal in either of such positions.

The heavy round wire of which the trap is preferably made, prevents injury to the fur of the animal.

The fact that the bail swings within the planes of the trap frame, makes it possible to operate this trap in holes no larger than the frame, and likewise permits the easy withdrawal of a trap from the hole, after the same has been sprung. Of course changes may be made in details of construction and operation without departing from the spirit and scope of my invention. I do not limit myself therefore to the exact form shown and described other than by the appended claims.

I claim:—

1. A trap comprising a stationary frame having parallel sides and upstanding parallel open ends, a movable bail pivoted to one of said sides between said ends and extending across said frame, means normally urging said bail into engagement with said ends, and a trigger for releasably holding said bail out of contact with said ends.

2. A trap comprising a stationary frame having horizontal parallel sides and upstanding parallel open ends, a movable bail pivoted to one of said sides, the legs of said bail extending across said frame and at one point lying in the planes of said ends, means normally urging said bail into engagement with said ends, and a trigger for releasably holding said bail out of contact with said ends.

3. A trap comprising a stationary one piece wire frame having horizontal parallel sides and upstanding parallel open ends bent up from said frame, a movable bail pivoted to one side of said frame, the legs of said bail extending across said frame, shoulders on said legs at points in the planes of said ends, means normally urging said bail to shoulder engaging position with said legs and a trigger for controlling said bail.

4. A trap comprising a one piece wire frame having sides and open looped ends for the passage of an animal therethrough, a wire bail pivoted to one of said sides and having legs extending across said looped ends directly adjacent thereto and having a portion thereof intersecting the planes of said ends, means normally urging said bail in one direction to restrict the space between said legs and said loops, and means for releasably holding said bail in non-obstructing position relative to said loops.

WILLIAM COOPER.